US009896946B2

(12) United States Patent
Noble

(10) Patent No.: US 9,896,946 B2
(45) Date of Patent: Feb. 20, 2018

(54) GAS TURBINE ENGINE ROTOR ASSEMBLY AND METHOD OF ASSEMBLING THE SAME

(71) Applicant: General Electric Company, Schenectady, NY (US)

(72) Inventor: Patrick Daniel Noble, Greenville, SC (US)

(73) Assignee: General Electric Company, Schenectady, NY (US)

( * ) Notice: Subject to any disclaimer, the term of this patent is extended or adjusted under 35 U.S.C. 154(b) by 1361 days.

(21) Appl. No.: 14/068,456

(22) Filed: Oct. 31, 2013

(65) Prior Publication Data
US 2015/0118055 A1    Apr. 30, 2015

(51) Int. Cl.
*F01D 5/30*     (2006.01)
*F01D 11/00*    (2006.01)
*F01D 5/22*     (2006.01)

(52) U.S. Cl.
CPC .............. *F01D 5/3007* (2013.01); *F01D 5/22* (2013.01); *F01D 11/006* (2013.01); *F05D 2220/32* (2013.01); *F05D 2230/60* (2013.01); *F05D 2240/80* (2013.01); *Y02T 50/672* (2013.01); *Y10T 29/49321* (2015.01)

(58) Field of Classification Search
CPC .......... F01D 9/042; F01D 5/3046; F01D 5/32; Y10T 29/49321
See application file for complete search history.

(56) References Cited

U.S. PATENT DOCUMENTS

| 2,669,383 | A | * | 2/1954 | Purvis | F01D 5/141 |
| | | | | | 416/219 R |
| 3,008,689 | A | * | 11/1961 | Morley | F01D 5/323 |
| | | | | | 416/193 A |
| 3,294,364 | A | * | 12/1966 | Stanley | F01D 5/3007 |
| | | | | | 416/193 A |
| 3,567,337 | A | * | 3/1971 | Zerlauth | F01D 5/32 |
| | | | | | 416/215 |
| 3,610,778 | A | * | 10/1971 | Suter | F01D 5/22 |
| | | | | | 416/193 A |
| 3,640,640 | A | * | 2/1972 | Palfreyman | F01D 5/30 |
| | | | | | 415/9 |
| 4,655,687 | A | * | 4/1987 | Atkinson | F01D 11/008 |
| | | | | | 416/190 |
| 4,802,824 | A | * | 2/1989 | Gastebois | F01D 5/282 |
| | | | | | 416/193 A |

(Continued)

Primary Examiner — Woody Lee, Jr.
Assistant Examiner — Adam W Brown
(74) Attorney, Agent, or Firm — Armstrong Teasdale LLP

(57) ABSTRACT

A rotor assembly includes a rotor disc including a plurality of circumferentially-spaced diskposts and a plurality of dovetail slots. Each dovetail slot is defined between a pair of circumferentially-adjacent diskposts. A plurality of rotor blades are coupled to the rotor disc. Each rotor blade includes a dovetail portion that is configured to slidably engage a respective dovetail slot. A plurality of platform sections are coupled to the rotor disc such that each platform section is adjacent a respective rotor blade. Each platform section includes a diskpost slot that is configured to receive one of the plurality of diskposts such that each dovetail slot receives a respective dovetail portion and at least a portion of at least one of the platform sections adjacent the rotor blade.

18 Claims, 7 Drawing Sheets

(56) References Cited

U.S. PATENT DOCUMENTS

| | | | |
|---|---|---|---|
| 5,222,865 A * | 6/1993 | Corsmeier | F01D 11/008 |
| | | | 416/193 A |
| 5,580,217 A | 12/1996 | Richards et al. | |
| 5,791,877 A * | 8/1998 | Stenneler | F01D 5/22 |
| | | | 416/204 A |
| 6,290,466 B1 * | 9/2001 | Ravenhall | F01D 5/282 |
| | | | 416/219 R |
| 6,832,896 B1 * | 12/2004 | Goga | F01D 5/3007 |
| | | | 416/191 |
| 6,905,311 B2 | 6/2005 | Leathart | |
| 7,300,253 B2 * | 11/2007 | Beeck | F01D 5/3007 |
| | | | 416/193 A |
| 7,931,442 B1 * | 4/2011 | Liang | F01D 5/3007 |
| | | | 416/193 A |
| 7,976,281 B2 | 7/2011 | Keith et al. | |
| 8,070,438 B2 | 12/2011 | Evans | |
| 8,277,190 B2 * | 10/2012 | Piersall | F01D 5/3007 |
| | | | 416/210 R |
| 2008/0232969 A1 * | 9/2008 | Brault | F01D 5/22 |
| | | | 416/219 R |

* cited by examiner

GAS TURBINE ENGINE ROTOR ASSEMBLY AND METHOD OF ASSEMBLING THE SAME

BACKGROUND

The embodiments described herein relate generally to gas turbine engine rotors, and more specifically, to rotor blades and platforms used in gas turbine engine rotor assemblies.

At least some known gas turbine engines compress air via a plurality of rotatable compressor blades and ignite a fuel-air mixture in a combustor to generate combustion gases that are channeled through rotatable turbine buckets along a hot gas path. Rows of blades or buckets convert thermal energy in the combustion gas stream into mechanical energy that rotates a turbine shaft, which may be used to power a machine, for example, an electric generator, a compressor, or a pump.

The rows of blades, which may be located in either or both of a compressor section and a turbine section of the gas turbine engine, are typically fixed to a rotor disc, that is rotatable around a central axis of the gas turbine engine. At least some blades are secured to the rotor disc by inserting a dovetail base portion of the individual blades into a corresponding dovetail slot in the rotor disc. Moreover, at least some known rotor blades include an integral platform that extends from the blade between the dovetail and an airfoil portion. When the blades extend outward from the rotor disc, the platforms define an inner flow path of the compressor or turbine section.

Blade and platform designs are at least partially limited by stresses induced to the airfoil shape during gas turbine engine operation, and materials for the blade are thus chosen to withstand such stresses. The platform area is subjected to lower levels of stress, but because it is integral to the blade, it is generally fabricated rom of the same material. As a result, the platform area may be over-designed and may be more costly and/or heavier than necessary than in a one piece blade. Furthermore, known integral blades include complex geometries, such as cooling passages or flanges, within the blade portion and/or the platform portion that present difficulties during the forging of such blades and that generally increase the costs and time associated with the manufacturing process.

BRIEF DESCRIPTION

In one aspect, a rotor assembly is provided. The rotor assembly includes a rotor disc including a plurality of circumferentially-spaced diskposts and a plurality of dovetail slots. Each dovetail slot is defined between a pair of circumferentially-adjacent diskposts. A plurality of rotor blades are coupled to the rotor disc. Each rotor blade includes a dovetail portion that is configured to slidably engage a respective dovetail slot. A plurality of platform sections are coupled to the rotor disc such that each platform section is adjacent a respective rotor blade. Each platform section includes a diskpost slot that is configured to receive one of the plurality of diskposts such that each dovetail slot receives a respective dovetail portion and at least a portion of at least one of the platform sections adjacent the rotor blade.

In another aspect, method of assembling a rotor assembly is provided. The method includes providing a rotor disc that includes a plurality of circumferentially-spaced diskposts and a plurality of dovetail slots such that each dovetail slot defined between circumferentially-adjacent diskposts. A rotor blade of a plurality of rotor blades is coupled into a respective dovetail slot such that a dovetail portion of the rotor blade slidably engages the dovetail slot. A platform section of a plurality of platform sections is coupled adjacent each rotor blade. Each platform section includes a diskpost slot that slidably engages one of the plurality of diskposts such that each dovetail slot includes a respective dovetail portion and at least a portion of at least one of the platform sections adjacent the rotor blade In yet another aspect, a gas turbine engine is provided. The gas turbine engine includes a turbine section and a compressor section coupled to the turbine section via a rotor assembly. The rotor assembly includes a rotor disc including a plurality of circumferentially-spaced diskposts and a plurality of dovetail slots. Each dovetail slot is defined between a pair of circumferentially-adjacent diskposts. A plurality of rotor blades are coupled to the rotor disc. Each rotor blade includes a dovetail portion that is configured to slidably engage a respective dovetail slot. A plurality of platform sections are coupled to the rotor disc such that each platform section is adjacent a respective rotor blade. Each platform section includes a diskpost slot that is configured to receive one of the plurality of diskposts such that each dovetail slot receives a respective dovetail portion and at least a portion of at least one of the platform sections adjacent the rotor blade.

DETAILED DESCRIPTION

Figure 1:
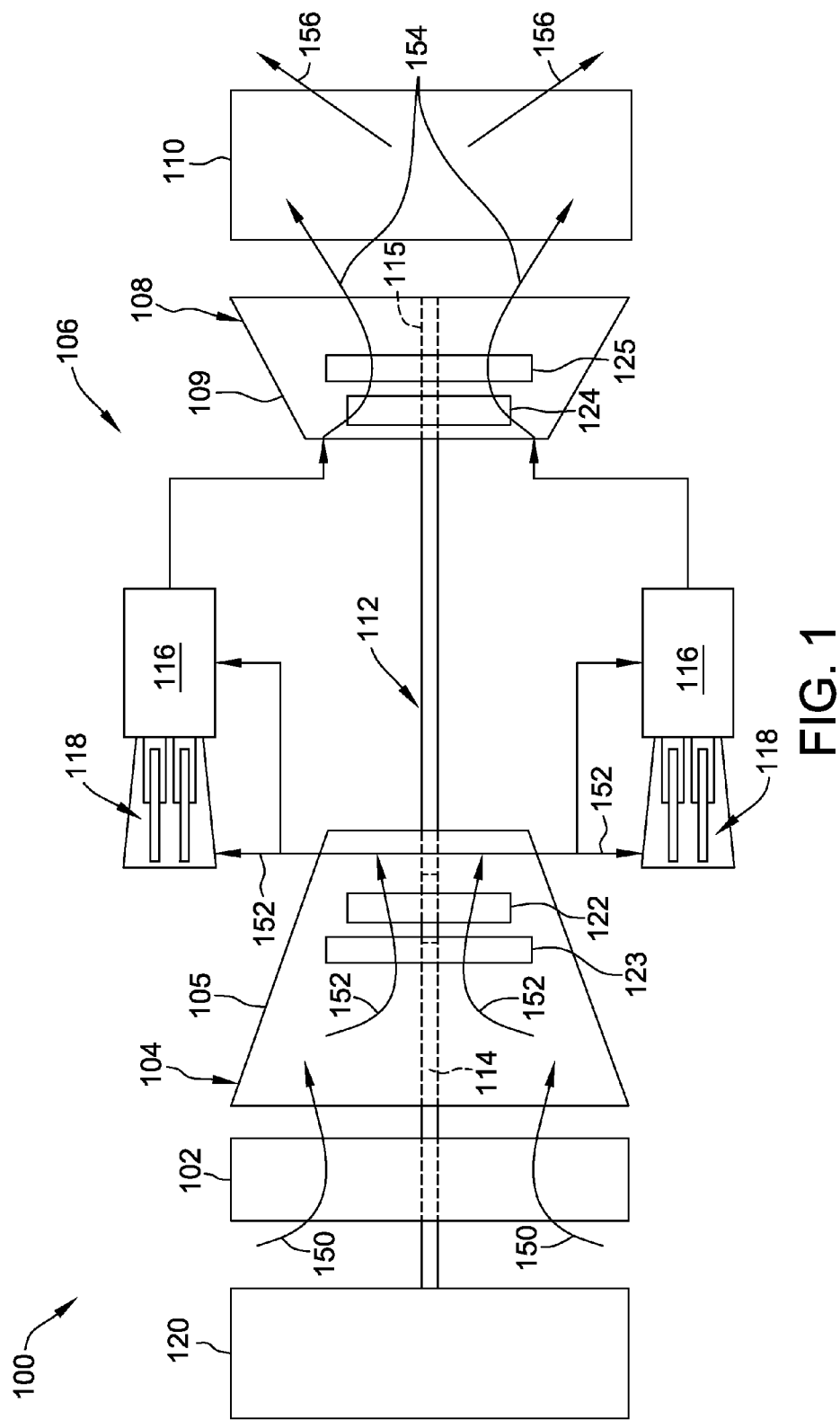
FIG. 1 is schematic diagram of an exemplary gas turbine engine.

FIG. 1 is a schematic view of an exemplary rotary machine 100, i.e., a turbomachine, and more specifically, a turbine engine. In the exemplary embodiment, turbine engine 100 is a gas turbine engine. Alternatively, turbine engine 100 may be any other turbine engine and/or rotary machine, including, without limitation, a steam turbine engine. In the exemplary embodiment, gas turbine engine 100 includes an air intake section 102, and a compressor section 104 that is downstream from, and in flow communication with, intake section 102. Compressor section 104 is enclosed within a compressor casing 105. A combustor section 106 is coupled downstream from, and in flow communication with, compressor section 104, and a turbine section 108 is coupled downstream from, and in flow communication with, combustor section 106. Turbine engine 100 is enclosed within a turbine casing 109 and includes an exhaust section 110 that is downstream from turbine section 108. Moreover, in the exemplary embodiment, turbine section 108 is coupled to compressor section 104 via a rotor assembly 112 that includes, without limitation, a compressor rotor, or drive shaft 114 and a turbine rotor, or drive shaft 115.

In the exemplary embodiment, combustor section 106 includes a plurality of combustor assemblies, i.e., combustors 116 that are each coupled in flow communication with compressor section 104. Combustor section 106 also includes at least one fuel nozzle assembly 118. Each combustor 116 is in flow communication with at least one fuel nozzle assembly 118. Moreover, in the exemplary embodiment, turbine section 108 and compressor section 104 are rotatably coupled to a load 120 via drive shaft 114. For example, load 120 may include, without limitation, an electrical generator and/or a mechanical drive application, e.g., a pump. Alternatively, gas turbine engine 100 may be an aircraft engine. In the exemplary embodiment, compressor section 104 includes at least one compressor blade assembly 122, i.e., blade 122 and at least one adjacent stationary vane assembly 123.

Also, in the exemplary embodiment, turbine section 108 includes at least one turbine blade assembly, i.e., a bucket 124, and at least one adjacent stationary nozzle assembly 125. Each compressor blade assembly 122 and each turbine bucket 124 is coupled to rotor assembly 112, or, more specifically, compressor drive shaft 114 and turbine drive shaft 115, respectively.

In operation, air intake section 102 channels air 150 towards compressor section 104. Compressor section 104 compresses inlet air 150 to higher pressures and temperatures prior to discharging compressed air 152 towards combustor section 106. Compressed air 152 is channeled to fuel nozzle assembly 118, mixed with fuel (not shown), and burned within each combustor 116 to generate combustion gases 154 that are channeled downstream towards turbine section 108. After impinging turbine bucket 124, thermal energy is converted into mechanical rotational energy that is used to drive rotor assembly 112. Turbine section 108 drives compressor section 104 and/or load 120 via drive shafts 114 and 115, and exhaust gases 156 are discharged through exhaust section 110 to ambient atmosphere.

Figure 2:
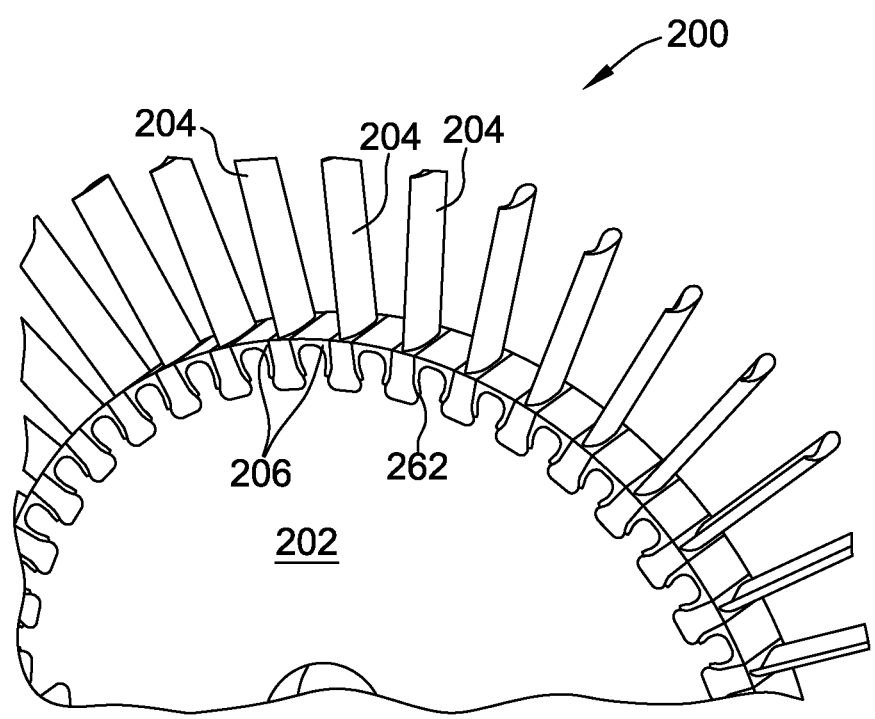
FIG. 2 is a perspective view of an exemplary rotor assembly that may be used with the gas turbine engine shown in FIG. 1.

FIG. 2 is a perspective view of an exemplary rotor assembly 200 that may be used with gas turbine engine 100 (shown in FIG. 1). In the exemplary embodiment, rotor assembly 200 is a compressor rotor assembly, but it should be appreciated that the following description may also apply to a turbine rotor assembly, or similar structure. Rotor assembly 200 includes a rotor disc 202, a plurality of rotor blades 204, and a plurality of platform sections 206. In the exemplary embodiment, blades 204 are circumferentially-spaced about, and are coupled to, a perimeter of rotor disc 202. Platforms 206 are also circumferentially-spaced about rotor disc 202 and are coupled between circumferentially-adjacent blades 204. In the exemplary embodiment, rotor disc 202 is a first stage rotor disk used in a first stage of compressor rotor assembly 114 (shown in FIG. 1). Alternatively, rotor disc 202 may be used in any stage of either compressor rotor assembly 114 or turbine rotor assembly 115 (shown in FIG. 1) that facilitates operation of gas turbine engine 100 (shown in FIG. 1) as described herein.

Figure 3:
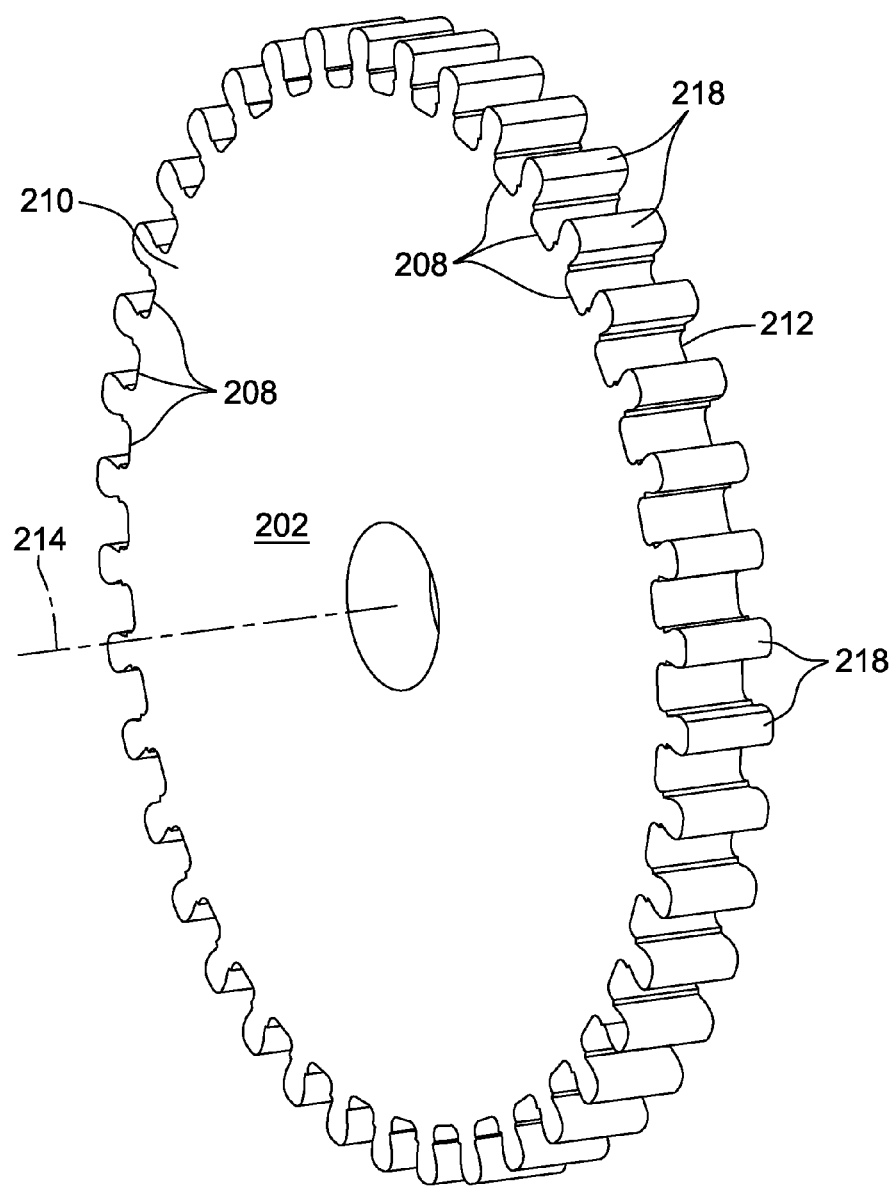
FIG. 3 is a perspective view of an exemplary rotor disc used with the rotor assembly shown in FIG. 2.

FIG. 3 is a perspective view of rotor disc 202 of rotor assembly 200 shown in FIG. 2. In the exemplary embodiment, rotor disc 202 includes a plurality of dovetail slots 208 that each extend through disc 202 from a first end face 210 to a second end face 212 of disc 202. More specifically, each dovetail slot 208 extends substantially parallel to a central axis 214 of disc 202 from first end face 210 to second end face 212. In the exemplary embodiment, rotor disc 202 also includes a plurality of circumferentially-spaced diskposts 218 that are spaced about the perimeter of disc 202 such that adjacent diskposts 218 define a dovetail slot 208 therebetween.

Figure 4:
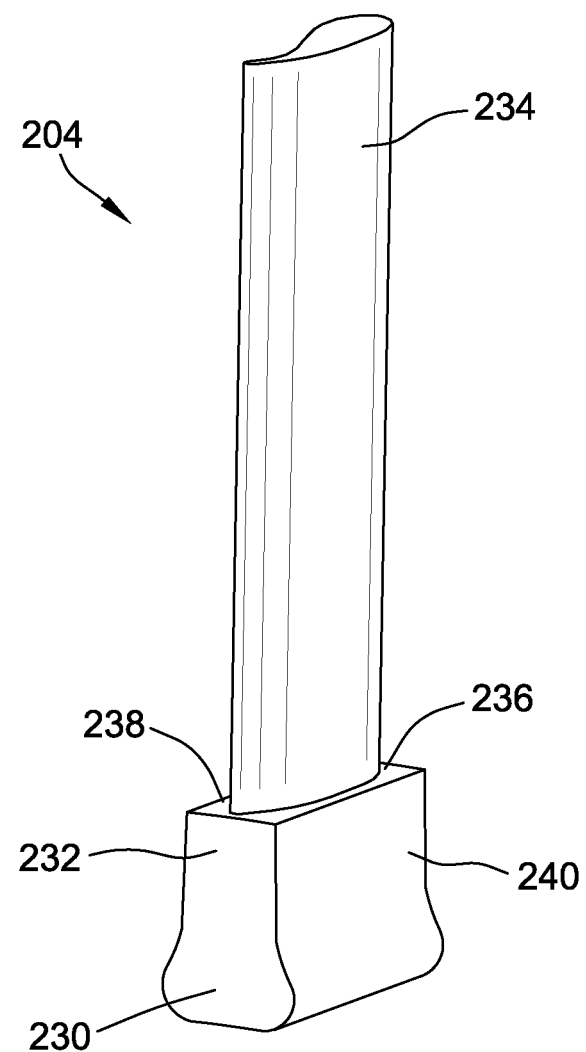
FIG. 4 is a perspective view of an exemplary rotor blade used with the rotor assembly shown in FIG. 2.
Figure 5:
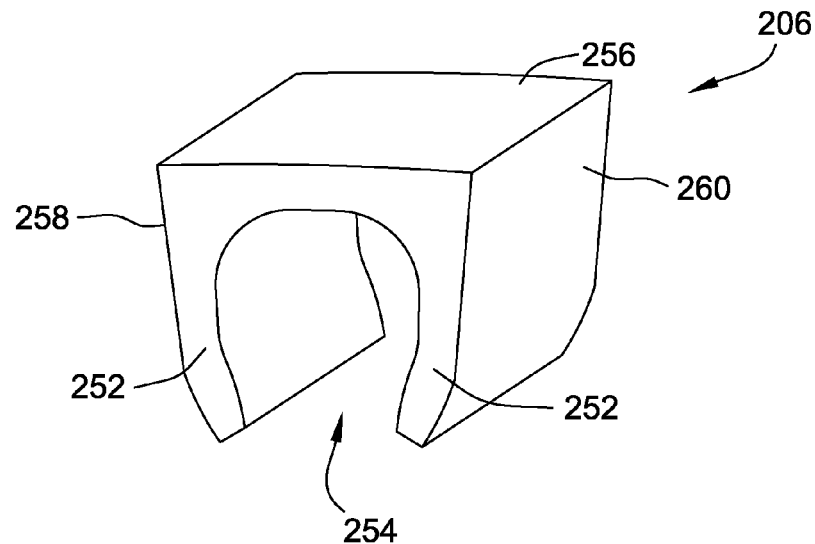
FIG. 5 is a perspective view of an exemplary platform section used with the rotor assembly shown in FIG. 2.

FIG. 4 is a perspective view rotor blade 204. In the exemplary embodiment, blade 204 includes a dovetail portion 230, a shank portion 232 that extends radially outward from dovetail portion 230, and an airfoil portion 234 that extends radially outward from an upper surface 236 of shank portion 232. Shank portion further includes a first side 238 and a second side 240. In the exemplary embodiment, each dovetail portion 230 is configured to be inserted into a dovetail slot 208 formed on rotor disc 202. Rotor blade 204 may be fabricated by casting, impression die forging, or seamless rolled ring forging processes, for example. Exemplary materials include, but are not limited to stainless steel alloys, titanium alloys, carbon-fiber composites, or any combination thereof FIG. 5 is a perspective view of platform section 206 of rotor assembly 200 (shown in FIG. 2). In the exemplary embodiment, platform section 206 includes a body portion 250 and a pair of opposing side arms 252 that extend radially inward from body portion 250. Arms 252 are arcuate and curve towards each other to define a diskpost slot 254 therebetween. Platform section 206 also includes an upper surface 256, a first side 258, and a second side 260. In the exemplary embodiment, platform section 206 is coupled to disc 202 such that at least a portion of one of the plurality of diskposts 218 is received by a respective diskpost slot 254. Platform section 206 may be fabricated by casting, impression die forging, or seamless rolled ring forging processes, for example. Materials that may be used to form platform 206 include, but are not limited to, stainless steel and titanium alloys or any combination thereof.

In the exemplary embodiment, assembling rotor assembly 200 as shown in FIG. 2 includes coupling a platform section 206 to rotor disc 202. More specifically, each platform section 206 is coupled to rotor disc 202 such that each diskpost 218 engages a respective diskpost slot 254. In the exemplary embodiment, platform section 206 is oriented in a substantially axial direction parallel to axis 214 onto rotor disc 202 and extends from first end face 210 to second end face 212 such that platform 206 may be installed from either face 210 or 212 of disc 202. Arcuate platform arms 252 slidably engage diskpost 218 such that arms 252 wrap around diskpost 218 to prevent movement of platform section 206 in a circumferential or a radial direction. More specifically, each diskpost 218 includes at least one notch 262 (shown in FIG. 2) formed on opposing circumferential sides (not shown) of diskpost 218 that engages a distal end (not shown) of platform arm 252. In the exemplary embodiment, notches 262 extend at least partially between first end face 210 and second end face 212 to facilitate aligning platform section 206. In the exemplary embodiment, arms 252 extend radially inward between body portion 250 and notches 262 and around diskpost 218 such that at least a portion of a first arm 252 of the pair of opposing arms 252 is positioned in a dovetail slot 208 and at least a portion of a second arm 252 is positioned in the adjacent dovetail slot 208.

Assembly of rotor assembly 200 also includes coupling a rotor blade 204 to rotor disc 202 adjacent to a previously installed platform section 206. More specifically, each rotor blade 204 is coupled to rotor disc 202 such that the dovetail portion 230 of each rotor blade 204 slidably engages a dovetail slot 208. In the exemplary embodiment, rotor blade 204 is coupled in a substantially axial direction that is substantially parallel to axis 214 onto rotor disc 202 and extends from first end face 210 to second end face 212 such that rotor blade 204 may be installed from either face 210 or 212 of disc 202. Rotor blade 204 is coupled to rotor disc 202 such that first side 238 of rotor blade 204 engages second side 260 of platform section 206. Another platform section 206 is then coupled to rotor disc 202 adjacent previously installed rotor blade 204 such that second side 240 of rotor blade 206 engages first side 258 of platform section 206. In the exemplary embodiment, blades 204 and platforms 206 are coupled to rotor disc 202 such that top surfaces 236 and 256 of blade 204 and platform 206, respectively, are flush to form at least a portion of a compressed air flow path (not shown) within compressor rotor assembly 114 (shown in FIG. 1).

In the exemplary embodiment, assembly of rotor assembly 200 continues around the circumference of rotor disc 202 by alternating installation of blades 204 and platforms 206. Alternatively, blade 204 may be initially coupled to rotor disc 202 followed by platform section 206. In another embodiment, each platform section 206 may be initially coupled to rotor disc 202 followed by coupling each rotor blade 204 between previously installed adjacent platform sections 206. Alternatively, each rotor blade 204 may be initially coupled to rotor disc 202 followed by coupling each platform section 206 between previously installed adjacent rotor blades 204. Rotor assembly 200 may further include conventional means such as lockwire and/or retention tabs to lock blades 204 and platform sections 206 in the axial direction.

In the exemplary embodiment, rotor blades 204 and platform sections 206 are coupled to rotor disc 202 such that the dovetail 230 of one rotor blade 204 and at least a portion of one arm 252 from each platform section 206 adjacent to the blade 204 are positioned in the same dovetail slot 208 between adjacent diskposts 218. Replacing an integral blade/platform assembly with separate rotor blade 204 and platform 206 components facilitates manufacturing blades 204 and platforms 206 from different materials so that each may be designed and fabricated to withstand the individual stress levels of each component. Specifically, this allows for thinner, lighter blades 204 and platforms 206 that reduce the cost of manufacturing and increase efficiency of gas turbine engine 100. Moreover, rotor blades 204 and platforms 206 are field replaceable such that damage to a single component does not require replacement of an integral blade/platform assembly. Further, separating platform 206 from blade 204 facilitates the use of cooling schemes for blade 204 and/or platform 206 that may not be feasible in a unitary blade/platform due to manufacturing constraints.

Figure 6:
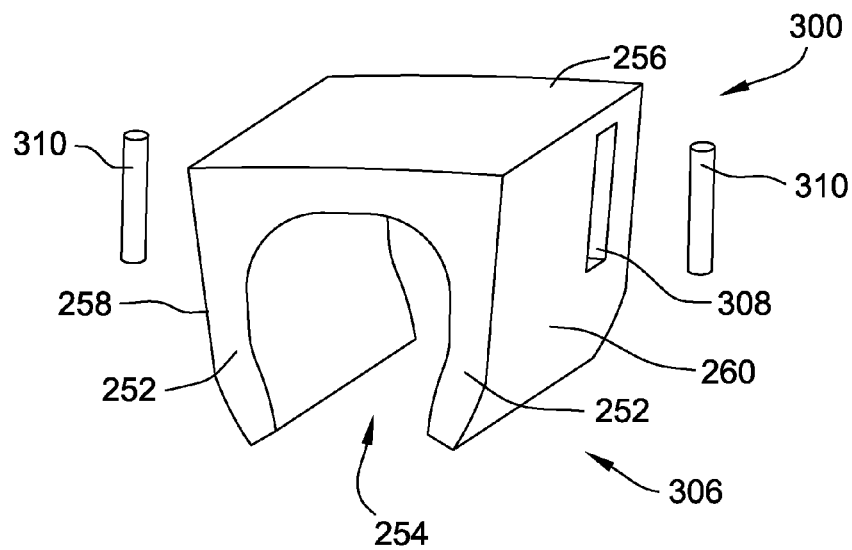
FIG. 6 is an alternative embodiment of a platform section used with the rotor assembly shown in FIG. 2.

FIG. 6 is an alternative platform section 306 that may be used with a rotor assembly 300 that is substantially similar to rotor assembly 200 (shown in FIG. 2). Platform section 306 is substantially similar to platform section 206 such that components common to FIGS. 1 and 6 are identified with the same reference numerals. Platform section 306 includes at least one seal pin pocket 308 that is oriented substantially radially and is configured to receive a seal pin 310 therein that facilitates sealing a gap (not shown) between sides 258 or 260 of platform 306 and sides 240 or 238, respectively, of an adjacent rotor blade 204 to reduce leakage of a fluid therethrough. In the exemplary embodiment, platform section 306 includes seal pin pockets 308 in each of first and sides 258 and 260. Alternatively, platform 306 may include as many seal pin pockets 308 in any configuration to facilitate operation of rotor assembly 300 as described herein. In the exemplary embodiment, seal pin pockets 308 are oriented proximate second end face 212 of rotor disc 202. Alternatively, seal pin pockets 308 may be oriented proximate first end face 210 of disc 202. In the exemplary embodiment, rotation of disc 202 causes seal pins 310 to contact sides 238 and 240 of rotor blade 204 to facilitate sealing the gap between platform 306 and adjacent rotor blade 204 to reduce leakage of a fluid therethrough and increase the efficiency of gas turbine engine 100 (shown in FIG. 1).

Figure 7:
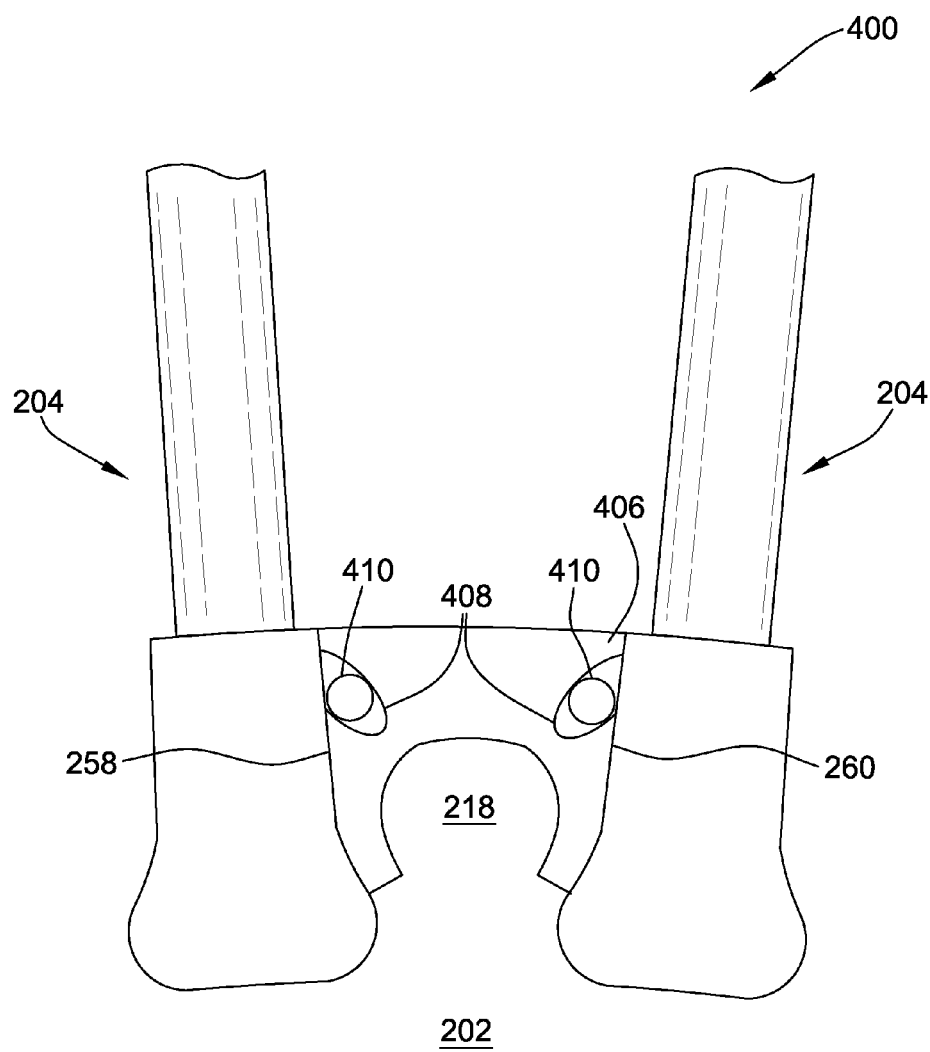
FIG. 7 is another alternative platform section that may be used with the rotor assembly shown in FIG. 2.

FIG. 7 is another alternative platform section 406 that may be used with a rotor assembly 400 that is substantially similar to rotor assembly 200 (shown in FIG. 2). Platform section 406 is substantially similar to platform section 206 such that components common to FIGS. 1 and 7 are identified with the same reference numerals. Platform section 406 includes at least one damper pin pocket 408 that is oriented axially parallel to axis 214 and is configured to receive a damper pin 410 therein that facilitates reducing vibrations of rotor assembly 400. In the exemplary embodiment, platform section 406 includes damper pin pockets 408 in each of first and sides 258 and 260 of body portion 250. Alternatively, platform 406 may include as many damper pin pockets 408 in any configuration to facilitate operation of rotor assembly 400 as described herein. In the exemplary embodiment, rotation of disc 202 causes damper pins 410 to contact sides 238 and 240 of an adjacent rotor blade 204 to facilitate reducing vibrations of rotor assembly 400. Furthermore, platform sections 306 and 406 may include both damper pockets 408 and damper pins 410 and also seal pin pockets 308 and seal pins 310 to facilitate simultaneously reducing vibrations and to provide sealing.

Figure 8:
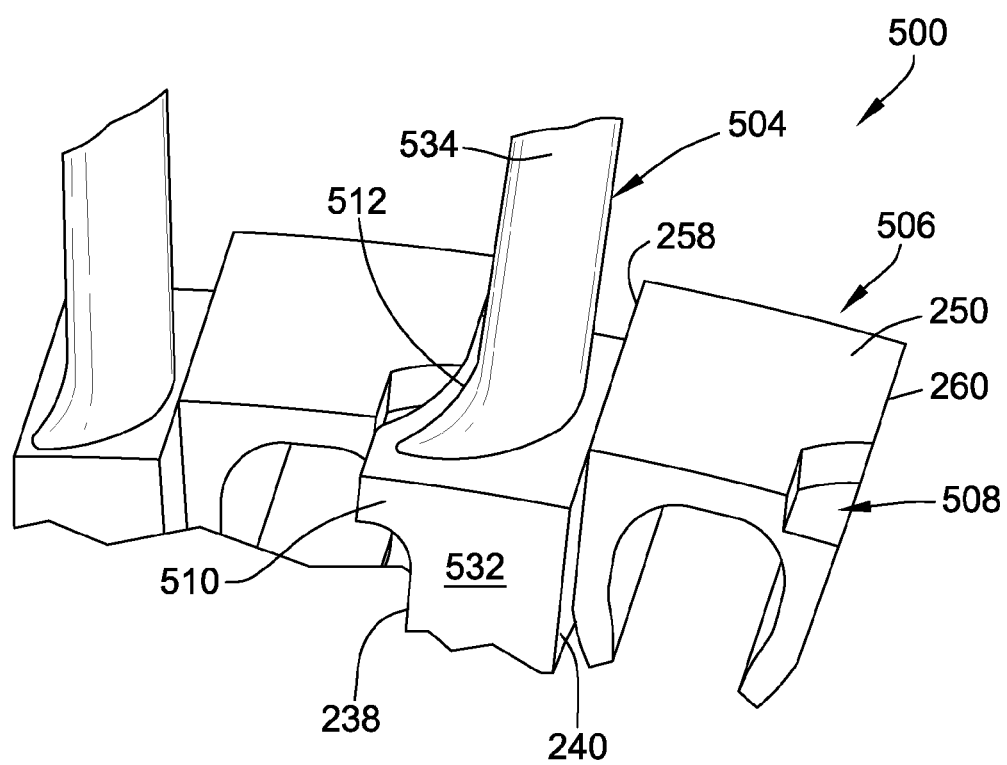
FIG. 8 is alternative rotor assembly that may be used with the gas turbine engine shown in FIG. 1.

FIG. 8 is a further alternative rotor assembly 500 that is substantially similar to rotor assembly 200 (shown in FIG. 2). Rotor assembly 500 is substantially similar to rotor assembly 200 such that components common to FIGS. 1 and 8 are identified with the same reference numerals. Rotor assembly 500 includes a rotor blade 504 that includes a shank portion 532 extending between dovetail portion 230 (shown in FIG. 4) and an airfoil portion 534. In one embodiment, shank portion 532 includes an extension flange 510 that extends circumferentially from first side 238 proximate first end face 210 (shown in FIG. 3) of rotor disc 202 (shown in FIG. 2). Alternatively, extension flange 510 may extend from second side 240. In one embodiment, at least a portion of airfoil 534 is positioned on flange 510 to facilitate a relatively large camber of airfoil 534. Rotor assembly 500 further includes a platform section 506 that is substantially similar to platform section 206 with the exception that platform section 506 includes a recess 508 in body portion 250 of second side face 260. Recess 508 is oriented proximate first end face 210 of rotor disc 202 and includes a shape that corresponds with extension flange 510 of rotor blade 504.

In one embodiment, rotor blade 504 is initially coupled to rotor disc 202 in the axial direction from first end face 210. Specifically, blade 504 is coupled to rotor disc 202 by inserting dovetail portion 230 into dovetail slot 208 (shown in FIG. 3) as described above. Platform section 506 is then coupled to rotor disc 202 in the axial direction from second end face 212 (shown in FIG. 3) such that flange 510 of one rotor blade 504 engages recess 508 of adjacent platform 506. Rotor blade 506 and platform 506 may be coupled in any order from either side of disc 202 that facilitates operation of rotor assembly 500 as described herein.

In one embodiment, extension flange 510 of rotor blade 504 is configured to engage recess 508 of an adjacent platform section 506 to facilitate altering a load path of rotor assembly 500 to reduce stress along a leading edge 512 of airfoil portion 534. Furthermore, the engagement of flange 510 and recess 508 facilitates at least partially sealing a gap (not shown) between blade 504 and platform 506 to reduce leakage of a fluid therethrough. Extension flange 510 and recess 508 may be used in combination with one or both of damper pockets 408 and damper pins 410 and also seal pin pockets 308 and seal pins 310 described above to facilitate reducing vibrations and to provide additional sealing.

Separation of the rotor blades from the platform sections within the rotor assembly facilitates reducing a thermal conflict that occurs in a conventional integral blade/platform assembly. Additionally, the embodiments described herein enable the blades and platforms to be fabricated from different materials, so that each may be designed and fabricated to withstand the stress levels associated with each component. This enables each blade to be fabricated from thinner and/or lighter materials that facilitate reducing the cost of manufacturing and increasing efficient of the engine. Moreover, the rotor blades and platforms are field replaceable such that damage to a single component does not require replacement of an integral blade/platform assembly. Further, because the platform and the blade are separate components, enhanced cooling schemes for the blade and/or platform that may not be feasible in a unitary blade/platform due to manufacturing constraints are possible.

Exemplary embodiments of a gas turbine engine rotor assembly and method of assembling the same are described above in detail. The methods and assemblies are not limited to the specific embodiments described herein, but rather, components of assemblies and/or steps of the methods may be utilized independently and separately from other components and/or steps described herein. For example, the methods may also be used in combination with other rotor assemblies and methods, such as in turbine rotor assemblies for gas turbine engines or steam turbine engines, and are not limited to practice with only the gas turbine compressor rotor assemblies and methods as described herein. Rather, the exemplary embodiment can be implemented and utilized in connection with many other rotor assembly applications.

Although specific features of various embodiments of the invention may be shown in some drawings and not in others, this is for convenience only. In accordance with the principles of the invention, any feature of a drawing may be referenced and/or claimed in combination with any feature of any other drawing.

This written description uses examples to disclose the invention, including the best mode, and also to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal language of the claims.

What is claimed is:

1. A rotor assembly comprising:
   a rotor disc comprising a plurality of circumferentially-spaced diskposts and a plurality of dovetail slots, each of said dovetail slots defined between a pair of circumferentially-adjacent diskposts;
   a plurality of rotor blades coupled to said rotor disc, each of said rotor blades comprises:
   a dovetail portion configured to slidably engage a corresponding one of said dovetail slots;
   a shank portion extending radially outward from said dovetail portion, circumferentially from a first side to a second side, and axially from a first end face downstream to a second end face; and
   an extension flange extending circumferentially outward from said first side of said shank portion and axially downstream from adjacent said first end face to an intermediate position less than halfway from said first end face to said second end face; and
   a plurality of platform sections, each of said platform sections is coupled to said rotor disc adjacent to one of said plurality of rotor blades, said platform section comprises a pair of circumferentially opposite arms and a body portion therebetween, said pair of arms and said body portion cooperating to define a diskpost slot, said diskpost slot is configured to receive one of said plurality of diskposts such that each of said dovetail slots receives a respective dovetail portion and at least one of said arms, each of said platform sections further comprising a recess complementary to and engaging said extension flange of said adjacent one of said plurality of rotor blades.

2. The rotor assembly in accordance with claim 1, wherein a first of each said pair of opposing arms is positioned in a first dovetail slot and a second arm of each said pair of opposing arms is positioned in a second dovetail slot that is circumferentially-adjacent to said first dovetail slot.

3. The rotor assembly in accordance with claim 1, wherein each of said diskposts comprises a pair of opposing circumferential sides that each include at least one notch formed therein and configured to engage an arm of said pair of arms.

4. The rotor assembly in accordance with claim 1, wherein each of said platform sections comprises at least one axially oriented pocket formed therein and sized to receive a damper pin therein.

5. The rotor assembly in accordance with claim 1, wherein each of said platform sections comprises at least one radially oriented pocket formed therein and sized to receive a seal pin therein.

6. The rotor assembly in accordance with claim 1, wherein each of said platform sections comprises at least one radially oriented pocket formed therein sized to receive a seal pin and at least one axially oriented pocket formed therein sized to receive a damper pin.

7. The rotor assembly in accordance with claim 1, wherein each of said rotor blades comprises an airfoil portion extending radially outward from said shank portion, at least a portion of said airfoil section is positioned on said extension flange.

8. The rotor assembly in accordance with claim 1, wherein said recess is configured to receive said extension flange of said adjacent rotor blade to form a seal between said rotor blade and said platform section.

9. The rotor assembly in accordance with claim 1, wherein a circumferential width of said dovetail portion increases between a radially outer end of said dovetail portion and an intermediate radial position along said dovetail portion, and decreases continuously between said intermediate radial portion and a radially inner end of said dovetail portion.

10. A method of assembling a rotor assembly, said method comprising:
   providing a rotor disc including a plurality of circumferentially-spaced diskposts and a plurality of dovetail slots, wherein each dovetail slot is defined between circumferentially-adjacent diskposts;

coupling a rotor blade into one of the plurality of dovetail slots such that a dovetail portion of the rotor blade slidably engages the dovetail slot, wherein the rotor blade further includes:
a shank portion extending radially outward from the dovetail portion, circumferentially from a first side to a second side, and axially from a first end face downstream to a second end face; and
an extension flange extending circumferentially outward from the first side of the shank portion and axially downstream from adjacent the first end face to an intermediate position less than halfway from the first end face to the second end face; and
coupling a platform section adjacent to the rotor blade, wherein the platform section includes a pair of circumferentially opposite arms and a body portion therebetween, the pair of arms and the body portion cooperating to define a diskpost slot, the diskpost slot configured to slidably engage one of the plurality of diskposts such that the dovetail slot receives the dovetail portion and one of the arms, wherein the platform section further includes a recess complementary to and engaging the extension flange of the rotor blade.

11. The method of claim 10 further comprising:
positioning a first arm of the pair of opposing arms in a first dovetail slot; and
positioning a second arm of the pair of opposing arms in a second dovetail slot that is circumferentially-adjacent to the first dovetail slot.

12. The method of claim 10 further comprising forming at least one axially oriented pocket in the platform section, wherein the pocket is sized to receive a seal pin therein.

13. The method of claim 10 further comprising forming at least one radially oriented pocket in the platform section, wherein the pocket is sized to receive a damper pin therein.

14. A gas turbine engine comprising:
a turbine section; and
a compressor section coupled to said turbine section via a rotor assembly, said rotor assembly comprising:
a rotor disc comprising a plurality of circumferentially-spaced diskposts and a plurality of dovetail slots, each of said dovetail slots defined between a pair of circumferentially-adjacent diskposts;
a plurality of rotor blades coupled to said rotor disc, each of said rotor blades comprises:
a dovetail portion configured to slidably engage a corresponding one of said dovetail slots;
a shank portion extending radially outward from said dovetail portion, circumferentially from a first side to a second side, and axially from a first end face downstream to a second end face; and
an extension flange extending circumferentially outward from said first side of said shank portion and axially downstream from adjacent said first end face to an intermediate position less than halfway from said first end face to said second end face; and
a plurality of platform sections, each of said platform sections is coupled to said rotor disc adjacent to one of said plurality of rotor blades, each said platform section comprises a pair of circumferentially opposite arms and a body portion therebetween, said diskpost slot is configure to receive one of said plurality of diskposts such that each of said dovetail slots receives a respective dovetail portion and at least one of said arms, each of said platform sections further comprising a recess complementary to and engaging said extension flange of said adjacent one of said plurality of rotor blades.

15. The gas turbine engine in accordance with claim 14, wherein each of said platform sections comprises at least one axially oriented pocket formed therein and sized to receive a damper pin therein.

16. The gas turbine engine in accordance with claim 14, wherein each of said platform sections comprises at least one radially oriented pocket formed therein and sized to receive a seal pin therein.

17. The gas turbine engine in accordance with claim 14, wherein said recess is configured to receive said extension flange of said adjacent rotor blade to form a seal between said rotor blade and said platform section.

18. The gas turbine engine in accordance with claim 14, wherein a circumferential width of said dovetail portion increases between a radially outer end of said dovetail portion and an intermediate radial position along said dovetail portion, and decreases continuously between said intermediate radial portion and a radially inner end of said dovetail portion.

* * * * *